United States Patent
Sakamoto

[11] Patent Number: 6,069,547
[45] Date of Patent: May 30, 2000

[54] BOBBIN FOR ELECTROMAGNET OF ELECTROMAGNET CLUTCH

[75] Inventor: Yuki Sakamoto, Isesaki, Japan

[73] Assignee: Sanden Corporation, Gunma, Japan

[21] Appl. No.: 08/937,600

[22] Filed: Sep. 29, 1997

[30] Foreign Application Priority Data

Oct. 3, 1996 [JP] Japan ................................. 8-262956

[51] Int. Cl.[7] ....................................................... H01F 7/20
[52] U.S. Cl. ............................................ 335/289; 336/192
[58] Field of Search ............................. 335/296–7, 289; 192/84 A, 84 C; 336/192, 198, 208; 361/104; 29/605–6

[56] References Cited

U.S. PATENT DOCUMENTS

| | | | |
|---|---|---|---|
| 1,595,692 | 8/1926 | Simmons | 335/289 |
| 3,854,562 | 12/1974 | Wilczewski | 192/84 C |
| 4,287,976 | 9/1981 | Sakaki et al. | . |
| 4,849,728 | 7/1989 | Goll et al. | 336/192 |
| 4,897,758 | 1/1990 | Pick et al. | 361/104 |
| 5,036,580 | 8/1991 | Fox et al. | 29/605 |
| 5,307,038 | 4/1994 | Ishimaru | . |
| 5,320,206 | 6/1994 | Maejima | 335/289 |

FOREIGN PATENT DOCUMENTS 2309023 11/1976 France .
1287692 1/1969 Germany .

OTHER PUBLICATIONS

European Search Report mailed Feb. 3, 1998.

*Primary Examiner*—Lincoln Donovan
*Attorney, Agent, or Firm*—Baker & Botts, L.L.P.

[57] ABSTRACT

A bobbin of an electromagnet of an electromagnetic clutch used for a refrigerant compressor for an automotive air conditioning system includes a cylinder and two flanges, each extending radially outward from the an end of the cylinder. The two flanges have several deep excisions at about locations at which weldlines would otherwise occur during the injection molding process for forming the bobbin. The excisions extend from outer fringes of the flanges inward direction almost reaching to the outer edge of the cylinder. By providing such deep excisions at the locations where the weldlines would otherwise occur, the occurrence of such weldlines is prevented, and the distortion stress, that tends to concentrate at such weldlines, may be reduced or eliminated. Accordingly, the warping of the flanges that tended to occur after the injection molding of the bobbin also may be reduced or eliminated. A plurality of shallow excisions also are provided along the outer edge of the flanges to enable the resin to spread in a laminar flow during the potting process of the core assembly which is composed of the core and coil assembly.

9 Claims, 6 Drawing Sheets

BOBBIN FOR ELECTROMAGNET OF ELECTROMAGNET CLUTCH

BACKGROUND OF THE INVENTION

1. Field of the Invention

The present invention relates to an electromagnetic clutch of a refrigerant compressor used for an automotive air-conditioning system. More particularly, it relates to a bobbin of an electromagnet for which the shape distortion that may occur after injection molding is reduced and the process of filling resin into the bobbin core may be improved.

2. Description of Related Art

With reference to FIG. 1, an electromagnetic clutch 400 of a refrigerant compressor 500 used for an automotive air-conditioning system generally consists of three subassemblies. These subassemblies are a core assembly 100, a rotor assembly 200, and an armature assembly 300. With reference to FIG. 2, core assembly 100 is made of core 150, coil assembly 10(10'), and resin 160. Coil assembly 10(10') is contained in a circular recess 151 of core 150, and is fixed by resin 160 which fills circular recess 151.

Basically, coil assembly 10 is made of a bobbin and a coil wound around the bobbin. In FIGS. 3, 4, and 5, the shape is shown of a bobbin according to the prior art. With reference to FIGS. 3–5, a bobbin 1 is constructed from a cylinder 2 and flanges 3 and 4, each of which extends in a radially outward direction from an opposite end of cylinder 2. For flanges 3 and 4, detailed structures are provided. With reference to FIG. 3, flange 3 has two ridges 32a and 32b which accommodate a thermal fuse (not shown) therebetween, two protrusions 33a and 33b on which lead wires (not shown) of the thermal fuse are hooked; two shallow recesses 34a and 34b which partially accommodate the pressure connection terminals that connect coil wires (not shown) and lead wires of the thermal fuse; and two notches 35a and 35b which introduce part of the coil wire to the outer surface of the flange 3. With reference to FIG. 5, flange 4 has an excision 43 and a protrusion 42 which has clip portions 42a and 42b for securing a terminal portion of the coil wire.

Bobbin 1 is made of synthetic resin, such as a nylon 6,6 containing glass fiber, and is formed by an injection molding process. With reference to FIG. 3, on the outer surface of flange 3 are three points 36, 36', and 36" that correspond to the gates of a metal mold used for injecting the resin. In an injection molding process of bobbin 1, resin, which is injected through points 36, 36', and 36" under high pressure, is cooled down within the metal mold while streaming and solidifying. The resin fills the metal mold to shape bobbin 1. During such injection molding, the streams of resin injected through points 36, 36', and 36" meet each other approximately at weldlines 37, 37', 37", 38, 38', and 38" and produce weldlines which do not have homogeneous physical properties. Weldlines 37, 37', 37", 38, 38', and 38" occur at locations substantially equidistant from points 36, 36', and 36".

The foregoing method for manufacturing bobbin 1 results in at least two serious defects. First,, distortion stress concentrates and persists at weldlines 37, 37', 37", 38, 38' and 38" and is very difficult to avoid in any injection molding process. Consequently, flanges 3 and 4 warp inward or outward over time after the injection molding is completed, as shown in FIGS. 6 and 7. FIG. 6 depicts bobbin I in which both flanges 3 and 4 have warped outward by the amount +e. Outward warping of flanges 3 and 4 is not necessarily a problem if it is contained within a tolerance limit. Inward warping of flanges 3 and 4, i.e., of amount –e, as depicted in FIG. 7, however, may be a severe problem. Even if the inward warp is slight, the coil wire can not be wound around bobbin 1 by automatic machinery. It is extremely difficult to reduce or eliminate the warping of flanges 3 and 4 in such bobbin structures.

Second, in known bobbin structures, the surface area of flanges 3 and 4 of bobbin 1, are too broad and hinder the laminar flow of resin into circular recess 151 of core 150. With reference to FIG. 2, core assembly 100 is made from core 150 and coil assembly 10 which is situated in circular recess 151 of core 150. A resin 160 is poured to fix the coil assembly 10 in the circular recess 151 of the core 150. The melting temperature of the thermal fuse is about 180° C. In order not to break the thermal fuse while filling circular recess 151 of core 150, the temperature of resin 160 flowing into circular recess 151 must be lower than the thermal fuse melting temperature. Often, an epoxy thermosetting resin is used for resin 160 because its melting temperature is about 60° C. and its thermosetting temperature is about 120° C. This process of filling resin 160 into circular recess 151 of core 150 is called the potting process and depends on a spontaneous streaming of resin 160. The surface area of flanges 3 and 4 of bobbin 1 is substantially the same as the area of circular recess 151, which hinders resin 160 from spreading adequately and may result in bubbles forming within resin 160. Water may readily intrude into resin 160 via these bubbles from the exterior of clutch 400. As a consequence, serious problems occur, such as the breaking down of the electrical insulation between the coil wire and core 150 or a reduction of the resistance of core assembly 10 to the effects of vibration.

SUMMARY OF THE INVENTION

Thus, a need has arisen for a bobbin in which the distortion of the flanges of the bobbin is reduced or eliminated. Further, a need has arisen for a bobbin in which bubbles produced by the potting process are reduced or eliminated. It is an object of the present invention to provide a bobbin of an electromagnetic clutch used for an automotive air conditioning system, which has an improved shape precision and may improve the potting process. In other words, it is an object of the present invention to provide a bobbin which may reduce or eliminate warping of the flanges after the injection molding is completed and may be manufactured by the potting process without producing bubbles.

In an embodiment of the invention, an injection molded bobbin for an electromagnet used in an electromagnetic clutch may comprise a cylinder having an outer cylinder edge and a pair of flanges. Each of the flanges has an outer flange edge and extends radially outward from the outer cylinder edge at one end of the cylinder. Each of the flanges has a flange width measured between the outer flange edge and the outer cylinder edge, and each of the flanges includes a plurality of first excisions. One of the flanges includes a plurality of injection gate receiving points, and each of the first excisions on that flange is positioned equidistant from an adjacent pair of the plurality of injection gate receiving points. Further, each of the first excisions extends from the outer flange edge substantially to the outer cylinder edge. Preferably, each of the first excisions extends from the outer flange edge for at least about 50% of the flange width, and more preferably, at least about 75% of the flange width.

In another embodiment of the invention, an injection molded bobbin for an electromagnet used in an electromagnetic clutch may comprise a cylinder having an outer cylinder edge and a pair of flanges. Each of the flanges has an outer flange edge and extends radially outward from the outer cylinder edge at one end of the cylinder. Each of the flanges has a flange width measured between the outer flange edge and the outer cylinder edge, and each of the flanges includes a plurality of first excisions. At least one of the flanges includes a plurality of injection gate receiving points, and each of the first excisions on the at least one flange is positioned equidistant from an adjacent pair of the plurality of injection gate receiving points. Further, each of the first excisions extends from the outer flange edge of one of the flanges toward the outer cylinder edge for at least about 50% of the flange width. In addition, each of the flanges includes a plurality of second excisions. Each of the second excisions extends from the outer flange edge of one of the flanges toward the outer cylinder edge, preferably about 10% of the flange width.

Other objects, features, and advantages of this invention will be understood from the following detailed description of preferred embodiments of this invention with reference to the attached drawings.

DETAILED DESCRIPTION OF PREFERRED EMBODIMENTS

Figure 3:
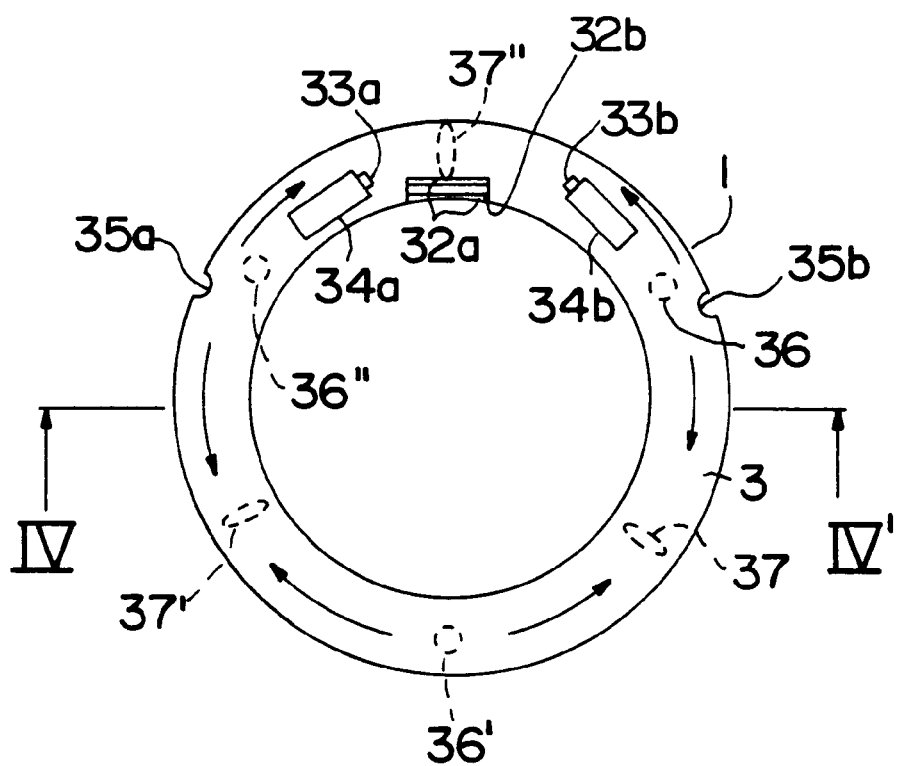
FIG. 3 is an overhead view of a known bobbin.
Figure 4:
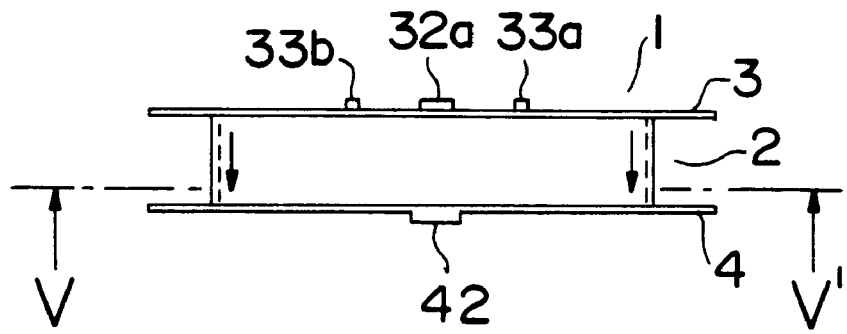
FIG. 4 is a cross-sectional view of a known bobbin along the line IV–IV' in FIG. 3.
Figure 5:
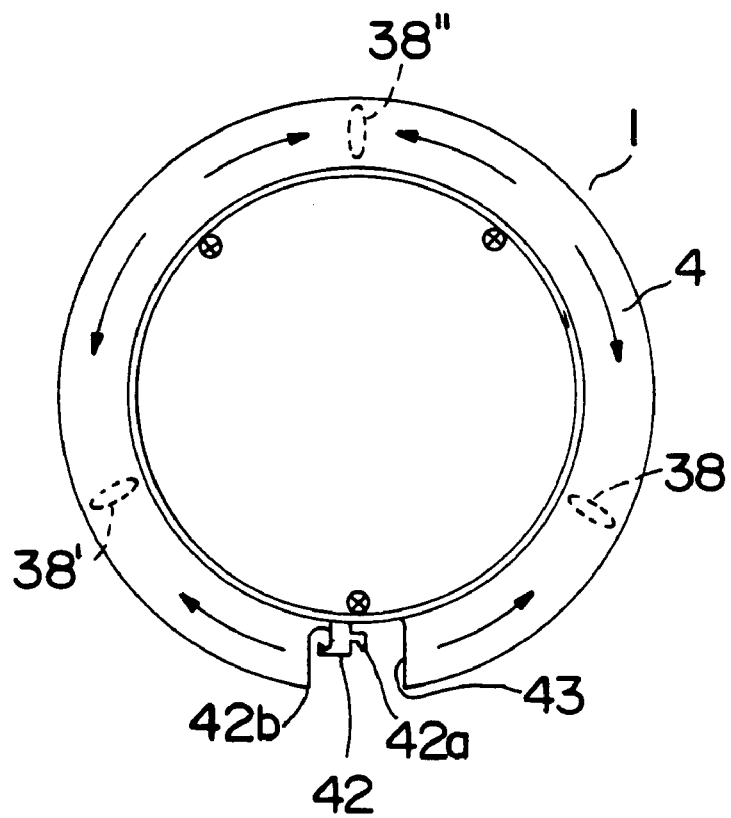
FIG. 5 is a bottom view of a known bobbin along the line V–V' in FIG. 4.
Figure 6:
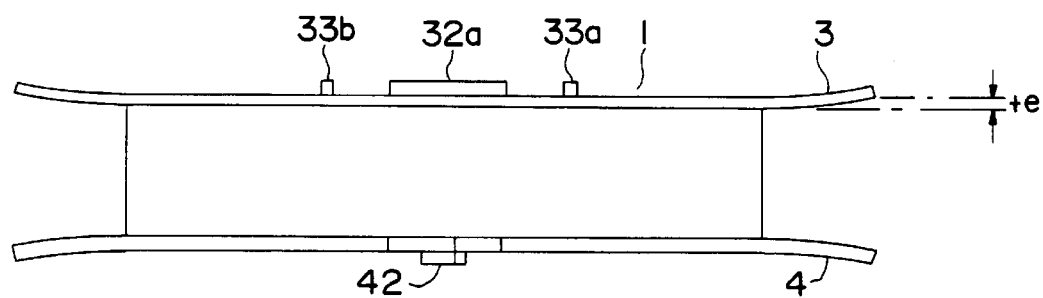
FIG. 6 is a cross-sectional view of a known bobbin showing outward warping of the flanges.
Figure 7:
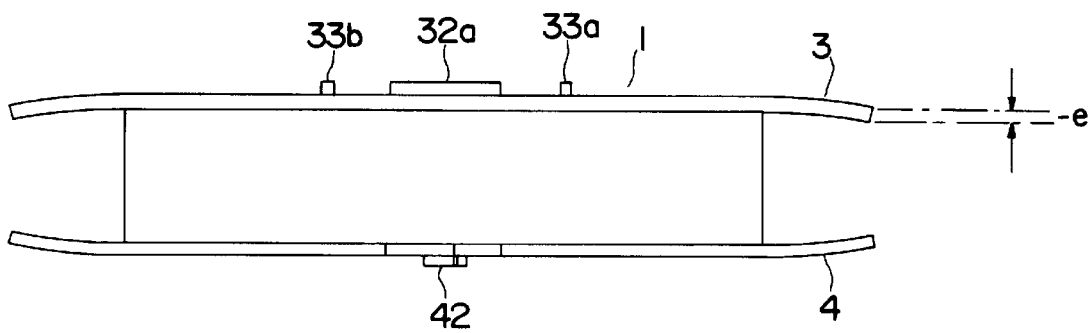
FIG. 7 is a cross-sectional view of a known bobbin according to the prior art showing yet another state of warps of the flanges.
Figure 8:
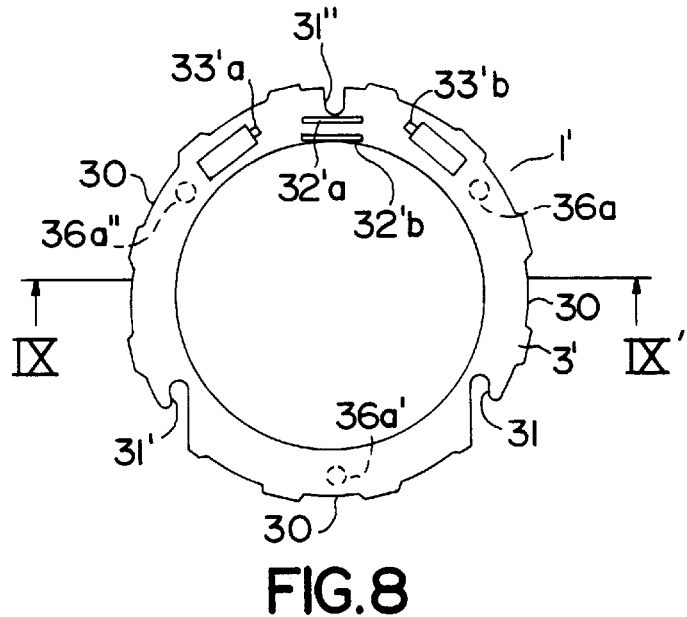
FIG. 8 is an overhead view of a bobbin according to the present invention.
Figure 9:
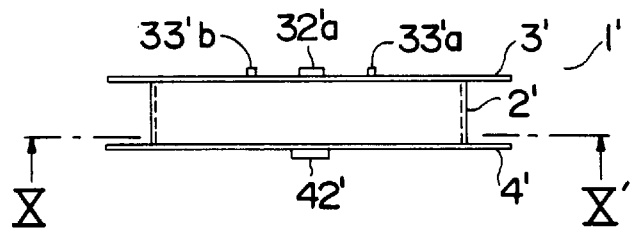
FIG. 9 is a cross-sectional view of a bobbin according to the present invention along the line IX–IX' in FIG. 8.
Figure 10:
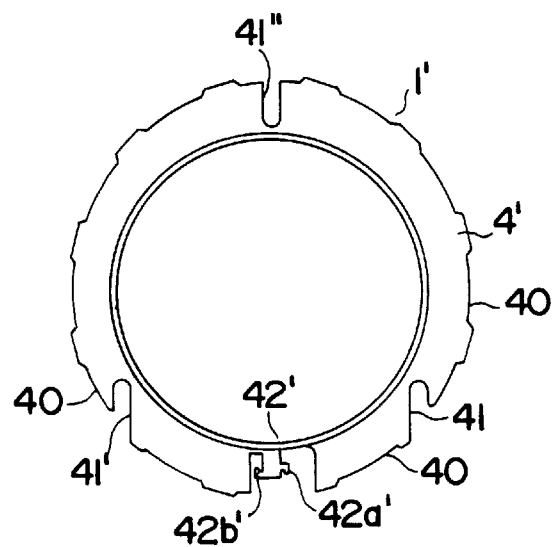
FIG. 10 is a cross-sectional view of a bobbin according to the present invention along the line X–X' in FIG. 9.

A preferred embodiment of the present invention is depicted with reference to FIGS. 8–12. With reference to FIG. 9, a bobbin 1' is constructed from a cylinder 2' and flanges 3' and 4' each of which extends radially outward from an opposite end of the cylinder 2'. With reference to FIG. 8, flange 3' of bobbin 1' of this preferred embodiment has relatively deep excisions 31, 31', and 31", which may extend from the outer flange edge of flange 3' substantially to the outer cylinder edge of cylinder 2'. For example, such excisions may extend at least about 50% of the distance between the outer edge of flange 3' and the outer edge of cylinder 2'. In another preferred embodiment, such excisions may extend at least about 75% of the distance between the outer edge of flange 3' and the outer edge of cylinder 2'. These excisions may extend inwardly from the outer edge of flange 3' at locations where the weldlines 37, 37' and 37" in FIG. 3 occurred. In FIG. 10, flange 4' of the bobbin 1' in this preferred embodiment has several relatively deep excisions 41, 41', and 41", similar to those described above with respect to flange 3'. These excisions may extend inwardly from the outer edge of flange 4' at locations where the weldlines 38, 38', and 38" in FIG. 5 occurred. Deep excisions 31, 31', 31", 41, 41', and 41" also extend in the vertical direction in the embodiment shown in FIGS. 8 and 10 for convenience in the designing of the metal mold used. Nevertheless, they may extend in radial directions with respect to flanges 3' and 4', respectively.

Thus, in a preferred embodiment, gate injection receiving points are only on flange 3'. With reference to FIG. 8, deep excisions 31, 31', and 31" are provided on flange 3' at the locations at which the leading edges of streams of the melted resin entering from gate injection receiving points 36a, 36a', and 36a" meet. With reference to FIG. 10, deep excisions 41, 41', and 41" are provided on flange 4'. Further, deep excisions 41, 41', and 41" are preferably aligned with deep excisions 31, 31', and 31". Thus, the occurrence of weldlines may be reduced or eliminated. As a result, the residual stress within the flanges caused by the existence of the weldlines that occur during the injection molding process may be reduced or eliminated to reduce the warping of the flanges that may occur after molding.

Figure 11:
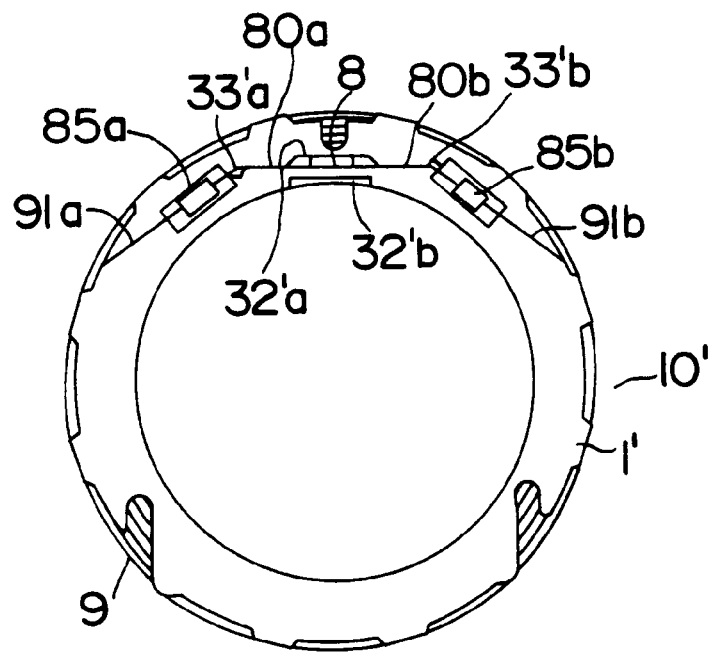
FIG. 11 is an overhead view of the coil assembly using the bobbin according to the present invention.
Figure 12:
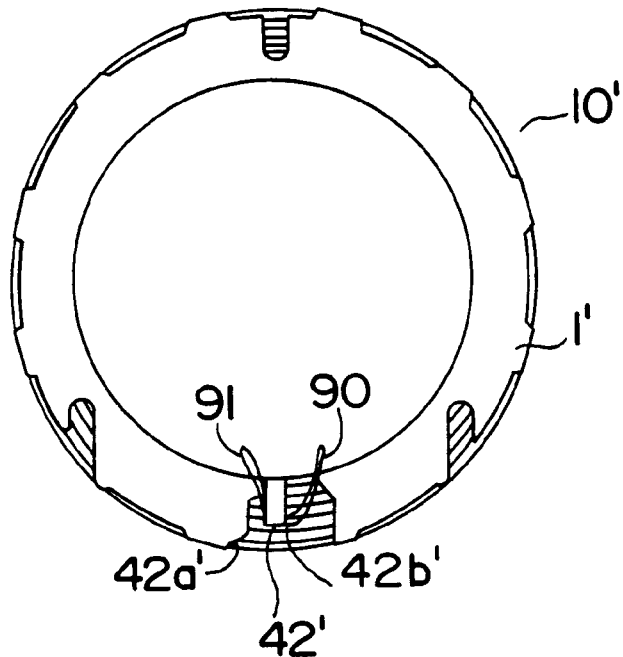
FIG. 12 is a bottom view of the coil assembly using the bobbin according to the present invention.

With reference to FIG. 8, the outer edge of flange 3' of bobbin 1' also includes a plurality of shallow excisions 30. For example, such excisions may extend about 10% of the distance between the outer edge of flange 3' and the edge of cylinder 2'. With reference to FIG. 10, the outer edge of flange 4' of bobbin 1' also includes a plurality of shallow excisions 40, similar to those described above with respect to flange 3'. FIGS. 11 and 12 disclose coil assemblies 10' assembled from bobbin 1' and coil wire 9 wound around bobbin 1'. With reference to FIG. 12, starting portion 90 of coil wire 9 is secured by a clip 42b' of a protrusion 42'. Similarly, end portion 91 of coil wire 9 is secured by clip 42a' of protrusion 42'. With reference to FIG. 11, end portions 91a and 91b of coil wire 9 are connected electrically with lead wires 80a and 80b of a thermal fuse 8 by pressure connection terminals 85a and 85b. Two ridges 32'a and 32'b enclose thermal fuse 8, and lead wires 80a and 80b hook on protrusions 33'a and 33'b, respectively.

Figure 1:
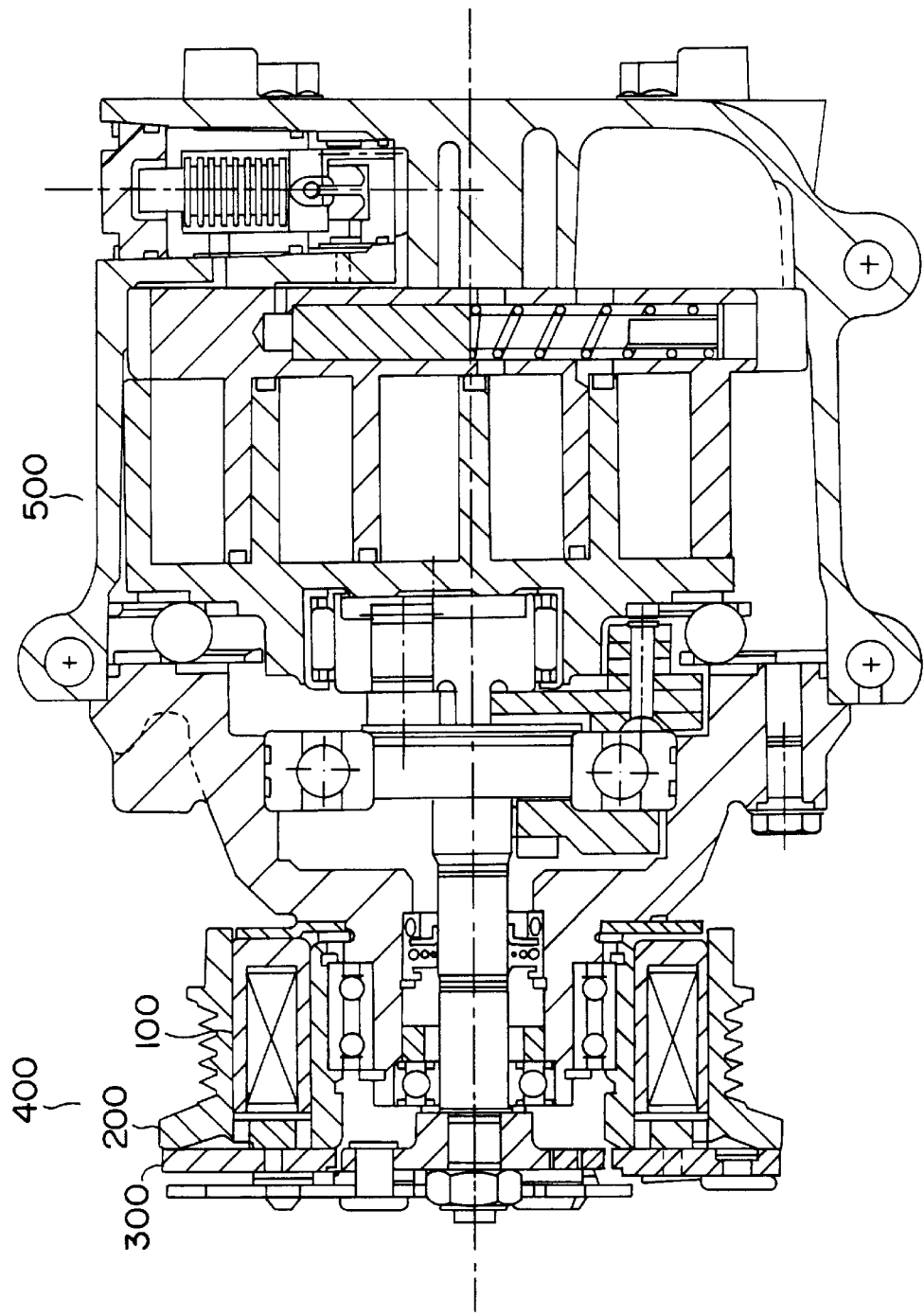
FIG. 1 is a longitudinal, cross-sectional view of a refrigerant compressor in automobile air conditioning systems.
Figure 2:
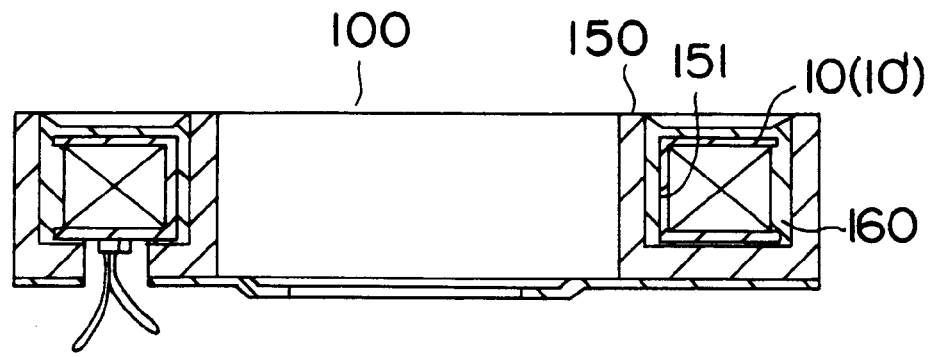
FIG. 2 is a longitudinal, cross-sectional view of a core assembly.

With reference to FIG. 2, coil assembly 10', constructed as described above, is positioned within circular recess 151 of core 150, and resin 160 fills in circular recess 151. When resin 160 is melted and forced into circular recess 151 by the potting process, resin 160 streams in a laminar flow through shallow excisions 30 and 40 in FIGS. 8 and 10, respectively, within circular recess 151 of core 150. As a result, defects associated with the potting process, such as the occurrence of bubbles, are reduced or eliminated.

As described above, the bobbin according to the present invention may reduce or eliminate the warping of the flanges that may occur after injection molding is completed and may improve the potting process to the extent that bubbles are reduced in number or size, or both, or eliminated from the resin.

Although the present invention has been described in detail in connection with preferred embodiments, the invention is not limited thereto. It will be understood by those of ordinary skill in the art that variations and modifications may be made within the scope of this invention, as defined by the following claims.

I claim:

1. An injection molded bobbin for an electromagnet used in an electromagnetic clutch, comprising a cylinder having an outer cylinder edge and a first flange and a second flange, each of said flanges having an outer flange edge and extending radially outward from said outer cylinder edge at one of end of said cylinder;

wherein each of said flanges has a flange width measured between said outer flange edge and said outer cylinder edge and includes a plurality of first excisions;

wherein each of said first excisions extend from said outer flange edge substantially to said outer cylinder edge;

wherein said first flange includes a plurality of injection gate receiving points; and wherein each of said first excisions on said first flange is positioned equidistant from an adjacent pair of said plurality of injection gate receiving points.

2. The bobbin of claim 1, wherein each of said first excisions extends from said outer flange edge toward said outer cylinder edge for at least about 50% of said flange width.

3. The bobbin of claim 1, wherein each of said first excisions extends from said outer flange edge toward said outer cylinder edge for at least about 75% of said flange width.

4. The bobbin of claim 1, wherein each of said flanges includes a plurality of second excisions, and each of said second excisions extends from said outer flange edge toward said outer cylinder edge.

5. The bobbin of claim 1, wherein each of said flanges includes a plurality of second excisions, and each of said second excisions extends from said outer flange edge toward said outer cylinder edge for about 10% of said flange width.

6. The bobbin of claim 1, wherein said bobbin is molded from a synthetic resin.

7. The bobbin of claim 6, wherein said synthetic resin is a nylon 6,6.

8. The bobbin of claim 1, wherein said bobbin is contained in a circular recess of a core of said electromagnet and said recess is filled with a thermosetting resin.

9. The bobbin of claim 8, wherein said circular recess includes a thermal fuse encapsulated by said thermosetting resin, said thermosetting resin having a synthetic resin melting temperature and said thermal fuse having a thermal fuse melting temperature greater than said synthetic resin melting temperature.

* * * * *